United States Patent
Huang et al.

(10) Patent No.: US 11,189,851 B2
(45) Date of Patent: Nov. 30, 2021

(54) CATALYST LAYER COMPOSITION FOR IMPROVED PERFORMANCE OF MEMBRANE ASSEMBLY ELECTRODE WITH IONIC LIQUID

(71) Applicants: Toyota Motor Engineering & Manufacturing North America, Inc., Plano, TX (US); Toyota Jidosha Kabushiki Kaisha, Aichi-ken (JP)

(72) Inventors: Kan Huang, Farmington Hills, MI (US); Hongfei Jia, Ann Arbor, MI (US); Hisao Kato, Nagoya (JP)

(73) Assignees: Toyota Motor Engineering & Manufacturing North America, Inc., Piano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 266 days.

(21) Appl. No.: 16/239,082

(22) Filed: Jan. 3, 2019

(65) Prior Publication Data

US 2020/0220190 A1 Jul. 9, 2020

(51) Int. Cl.
*H01M 8/1004* (2016.01)
*H01M 4/92* (2006.01)
*H01M 8/1039* (2016.01)
*H01M 8/1018* (2016.01)

(52) U.S. Cl.
CPC ......... *H01M 8/1004* (2013.01); *H01M 4/921* (2013.01); *H01M 4/926* (2013.01); *H01M 8/1039* (2013.01); *H01M 2008/1095* (2013.01); *H01M 2300/0082* (2013.01)

(58) Field of Classification Search
CPC .. H01M 8/1004; H01M 4/926; H01M 8/1039; H01M 4/921; H01M 2300/0082; H01M 2008/1095; H01M 4/8663; H01M 8/1018; Y02E 60/50
USPC ........................................................ 429/483
See application file for complete search history.

(56) References Cited

U.S. PATENT DOCUMENTS

| | | | |
|---|---|---|---|
| 5,872,602 A | 2/1999 | Johnson | |
| 7,146,802 B2 | 12/2006 | Lee | |
| 9,511,358 B2 | 12/2016 | Nazarpoor et al. | |
| 2007/0044444 A1 | 3/2007 | Oshimi | |
| 2007/0116870 A1 | 5/2007 | Dettling et al. | |

(Continued)

OTHER PUBLICATIONS

Huang, K. et al., "Enhancing Pt/C Catalysts for the Oxygen Reduction Reaction with Protic Ionic Liquids: The Effect of Anion Structure", J. Electrochem. Soc., 164, pp. F1448-F1459 (2017).

(Continued)

*Primary Examiner* — Gary D Harris
(74) *Attorney, Agent, or Firm* — Christopher G. Darrow; Darrow Mustafa PC (57) ABSTRACT

A membrane electrode assembly for a polymer electrolyte membrane fuel cell includes an anodic catalyst layer, a cathodic catalyst layer, and a polymer electrolyte membrane mediating protic communication between the anodic and cathodic catalyst layers. The cathodic catalyst layer includes an ionic liquid, 1-methyl-2,3,4,6,7,8-hexahydro-1H-pyrimido[1,2-a]pyrimidin-9-ium 1,1,2,2,3,3,4,4,4-nonafluorobutane-1-sulfonate, in admixture with carbon-supported particles of platinum or a platinum alloy. The ionic liquid improves performance in both high moisture and low moisture operating conditions.

20 Claims, 4 Drawing Sheets

(56) References Cited

U.S. PATENT DOCUMENTS

| | | |
|---|---|---|
| 2011/0177428 A1 | 7/2011 | Dai et al. |
| 2011/0189589 A1 | 9/2011 | Erlebacher et al. |
| 2013/0312407 A1 | 11/2013 | Surnilla et al. |
| 2014/0113218 A1 | 4/2014 | Erlebacher et al. |
| 2016/0158730 A1 | 6/2016 | Peng |
| 2018/0283251 A1 | 10/2018 | Rowe et al. |
| 2018/0287165 A1 | 10/2018 | Huang et al. |
| 2019/0267636 A1* | 8/2019 | Kongkanand ......... H01M 4/926 |

OTHER PUBLICATIONS

Chen, B. et al., Improving the Conductivity of Sulfonated Polyimides as Proton Exchange Membranes by Doping of a Protic Ionic Liquid, Polymers, 6, pp. 2720-2736 (2014).

Snyder, J., "Oxygen reduction reaction performance of [MTBD][beti]-encapsulated nanoporous NiPt alloy nanoparticles," Advanced Functional Materials, 44, p. 5494 (2013).

Zhang, G. et al., "Accelerating Oxygen-Reduction Catalysts through Preventing Poisoning with Non-Reactive Species by Using Hydrophobic Ionic Liquids," Angewandte Chemie International edition, 6, p. 2257 (2016).

Department of Energy (DOE) Annual Merit Review Proceedings, "Highly-Accessible Catalysts for Durable High-Power Performance," FC 144 (2018).

Zhang, G. et al., "Boosting Performance of Low Temperature Fuel Cell Catalysts by Subtle Ionic Liquid Modification," ACS Appl. Mater. Interfaces, 7, pp. 3562-3570 (2015).

Snyder, J. et al., "Oxygen reduction in nanoporous metal-ionic liquid composite electrocatalysts," Nature Materials, vol. 9, pp. 904-907 (2010).

Zhang, C. et al., "Octahedral Pt2CuNi Uniform Alloy Nanoparticle Catalyst with High Activity and Promising Stability for Oxygen Reduction Reaction," ACS Catal. 5, pp. 2296-2300 (2015).

Wang, C. et al., "Rational Development of Ternary Alloy Electrocatalysts," J. Phys. Chem. Lett., 3, pp. 1668-1673 (2012).

Zhang, H. et al., "Catalytic decomposition of N20 over NixCol—xCOA104 spinel oxides prepared by sol-gel method," J Fuel Chem Technol, 43(1), pp. 81-87 (2015).

Zhu, J. et al., "Effect of CE on NO direct decomposition in the absence/presence of O2 over La1—xCexSrNiO4 (0≤x≤0.3)", Journal of Molecular Catalysis A: Chemical 234, p. 9 (2005).

Zhu, Y. et al., "Direct NO decomposition over La2—xBAxNiO4 catalysts containing BaCO3 phase", Applied Catalysis B: Environmental, 82, pp. 255-263 (2008).

Zhu, J. et al., "Study of La2_xSrxCuO4 (x-0.0, 0.5, 1.0) catalysts for NO+CO reaction from the measurements of Ox-TPD, H2-TPR and cyclic voltammetry," Journal of Molecular Catalysis A: Chemical, 238, pp. 35-40 (2005).

Pan, K.L. et al., "Direct N2O decomposition over La2NiO4-based perovskite-type oxides", Journal of the Air & Waste Management Association, 64, pp. 1260-1269 (2014).

Clement, R. et al., "Review-Manganese-Based P2-Type Transition Metal Oxides as Sodium-Ion Battery Cathode Materials," Journal of the Electrochemical Society, 162 (14), pp. A2589-A2604 (2015).

Belt, J. et al., "Calendar and PHEV cycle life aging of high-energy, lithium-ion cells containing blended spinel and layered-oxide cathodes," Journal of Power Sources, vol. 196, Issue 23, pp. 10213-10221 (2011).

\* cited by examiner

MTBD    C$_4$F$_9$SO$_3$

CATALYST LAYER COMPOSITION FOR IMPROVED PERFORMANCE OF MEMBRANE ASSEMBLY ELECTRODE WITH IONIC LIQUID

TECHNICAL FIELD

The present disclosure generally relates to fuel cells and, more particularly, to cathodic catalysts of polymer electrolyte membrane fuel cells having ionic liquids.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Fuel cell vehicles represent a promising option for future mobility because they afford high energy efficiency and include a zero emission powertrain platform. All current fuel cell vehicles on market use polymer electrolyte membrane fuel cells (PEMFCs). While the PEMFC technology has been commercialized for decades, it still faces major challenges of high material cost and substantial performance gap.

PEMFCs typically require efficient proton transport in their electrocatalyst layers in order to carry out the oxygen reduction reaction, and often underperform in very dry conditions due to poor proton transport in the absence of sufficient water. At the same time, excessive water can also impair performance. Therefore, it would be desirable to develop improved PEMFC catalyst layers having superior proton transport capability under varying humidity conditions.

SUMMARY

This section provides a general summary of the disclosure, and is not a comprehensive disclosure of its full scope or all of its features.

In various aspects, the present teachings provide a membrane electrode assembly (MEA) for a polymer electrolyte membrane fuel cell. The MEA includes an anodic catalyst layer, a cathodic catalyst layer, and a polymer electrolyte membrane mediating protic communication between the anodic and cathodic catalyst layers. The anodic catalyst layer includes carbon supported anodic catalyst particles, the anodic catalyst particles including particles of a metal selected from the group consisting of: platinum; and a platinum alloy. The cathodic catalyst layer includes an ionic liquid, comprising 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]), in admixture with carbon supported cathodic catalyst particles. The cathodic catalyst particles include particles of a metal selected from the group consisting of: platinum; and a platinum alloy. The MEA further includes a polymer electrolyte membrane mediating protic communication between the anodic catalyst layer and the cathodic catalyst layer.

In other aspects, the present teachings provide a membrane electrode assembly (MEA) for a polymer electrolyte membrane fuel cell. The MEA includes an anodic catalyst layer, a cathodic catalyst layer, and a polymer electrolyte membrane mediating protic communication between the anodic and cathodic catalyst layers. The anodic catalyst layer includes an ionic liquid, comprising 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]), in admixture with carbon supported anodic catalyst particles, the anodic catalyst particles including particles of a metal selected from the group consisting of: platinum; and a platinum alloy. The cathodic catalyst layer includes the ionic liquid, ([MTBD][$C_4F_9SO_3$]), in admixture with carbon supported cathodic catalyst particles. The cathodic catalyst particles include particles of a metal selected from the group consisting of: platinum; and a platinum alloy. The MEA further includes a polymer electrolyte membrane mediating protic communication between the anodic catalyst layer and the cathodic catalyst layer.

In yet other aspects the present teachings provide a polymer electrolyte membrane fuel cell having a plurality of stacked membrane electrode assemblies (MEAs). Each MEA includes an anodic catalyst layer, a cathodic catalyst layer, and a polymer electrolyte membrane mediating protic communication between the anodic and cathodic catalyst layers. The anodic catalyst layer includes carbon supported anodic catalyst particles, the anodic catalyst particles including particles of a metal selected from the group consisting of: platinum; and a platinum alloy. The cathodic catalyst layer includes an ionic liquid, comprising 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]), in admixture with carbon supported cathodic catalyst particles. The cathodic catalyst particles include particles of a metal selected from the group consisting of: platinum; and a platinum alloy. The MEA further includes a polymer electrolyte membrane mediating protic communication between the anodic catalyst layer and the cathodic catalyst layer.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

DETAILED DESCRIPTION

The present teachings describe membrane electrode assemblies (MEAs) for polymer electrolyte membrane fuel cells (PEMFCs). MEAs of the present teachings include electrodes having novel composites of catalyst and protic ionic liquid. The disclosed MEAs exhibit notably superior performance at low relative humidity, compared to MEAs lacking the protic ionic liquid, across a broad range of current densities. The disclosed MEAs exhibit notably superior performance at high relative humidity, compared to MEAs lacking the protic ionic liquid, at high current densities.

MEAs of the present teachings include a composite cathode having a cathode catalyst mixed with an ionic liquid of formula [MTBD] [$C_4F_9SO_3$]. The catalyst can include platinum or a platinum alloy, such as a platinum-cobalt alloy. The composite cathode improves MEA performance in both low and high humidity.

Figure 1:
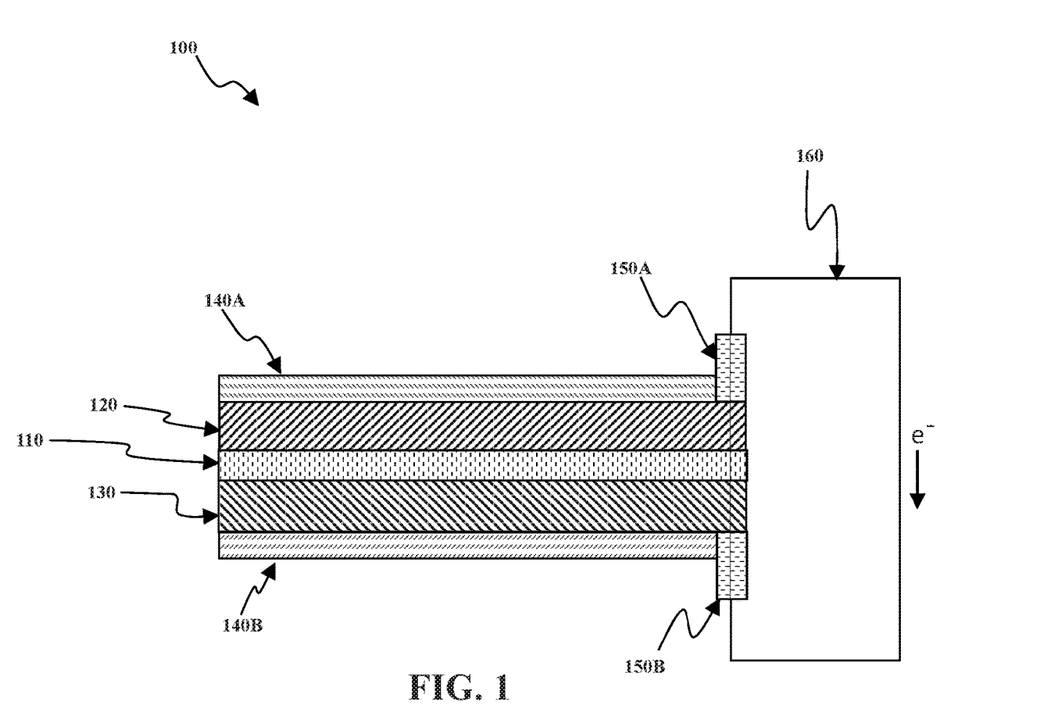
FIG. 1 is a schematic cross sectional view of a membrane electrode assembly of the present teachings.

FIG. 1 shows a schematic cross sectional view of an exemplary, disclosed MEA 100 for a PEMFC. The MEA 100 includes a polymer electrolyte membrane (PEM) 110 configured to support proton transfer (i.e. proton conduction) across the membrane 110, and to be electrically insulative. The PEM 110 can be a pure polymer membrane or a composite membrane, and can be formed of any suitable material, such as perfluorosulfonic acid, other fluoropolymers, or any other suitable material. The MEA 100 further includes an anodic catalyst layer 120, configured to electrolytically catalyze an anodic hydrogen-splitting reaction:

$$H_2 \rightarrow 2e^- + 2H^+.$$

The anodic catalyst layer can be substantially formed of anodic catalyst particles of platinum or a platinum alloy supported on carbon, such as carbon black.

The MEA 100 further includes a cathodic catalyst layer 130, configured to catalyze an oxygen reduction reaction:

$$O_2 + 4e^- + 4H^+ \rightarrow 2H_2O.$$

Figure 2:
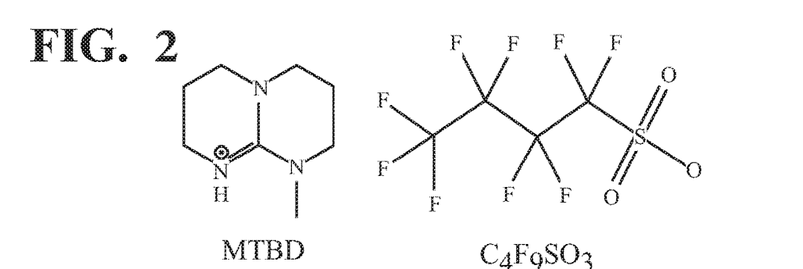
FIG. 2 shows chemical line drawings of the cation and anion of an ionic liquid utilized in the membrane electrode assembly of FIG. 1.

The cathodic catalyst layer can include cathodic catalyst particles of platinum or a platinum alloy supported on carbon, such as carbon black. The cathodic catalyst will typically further include an ionic liquid in admixture with the carbon-supported cathodic catalyst particles. In many implementations, the ionic liquid will be 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$]). FIG. 2 shows line drawings of the MTBD cation and the $C_4F_9SO_3$ anion. In some implementations, the cathodic catalyst particles will be a platinum-cobalt alloy. In some such implementations, the weight ratio of platinum to cobalt can be about 10:1.

In some implementations, the anodic catalyst layer 120 and/or the cathodic catalyst layer 130 can include a solid ionomer, such as a fluorinated polymer, e.g. Nafion™. In some variations, the anodic catalyst layer 120 can include platinum (whether present unalloyed or in an alloy) at a loading density of about 0.05 $mg_{Pt}/cm^2$; and the cathodic catalyst layer 130 Pt can include platinum (whether present unalloyed or in an alloy) at a loading density within a range of from about 0.1 to about 0.15 $mg_{Pt}/cm^2$, inclusive. In some implementations, the weight ratio of ionic liquid to carbon-supported cathodic catalyst particles can be about 1:10.

It will be understood that the PEM places the anodic catalyst layer 120 and the cathodic catalyst layer in protic communication with one another. The MEA 100 can include first and second gas diffusion layers 140A, 140B in contact with the anodic catalyst layer 120 and the cathodic catalyst layer 130, respectively. The first and second gas diffusion layers 140A, 140B are configured to allow hydrogen and oxygen gas to diffuse to the anodic and cathodic catalyst layers, 120, 130, respectively, and to allow water product to diffuse away from the cathodic catalyst layer 130. The MEA 100 can further include anodic and cathodic current collectors 150A, 150B, configured to be in electric communication with the anodic and cathodic catalyst layers 120, 130, respectively, and to connect to be connected to an external circuit 160.

In some implementations, the anodic and/or cathodic catalyst particles will have a specific surface area of at least 10 $m^2/g$, or 20 $m^2/g$, or 30 $m^2/g$, or 40 $m^2/g$, or 50 $m^2/g$, or 60 $m^2/g$, or 70 $m^2/g$, or 80 $m^2/g$, or 90 $m^2/g$, or 100 $m^2/g$. In some implementations, the anodic and/or cathodic catalyst particles will be nanoparticles having an average maximum dimension of less than 100 nm, or less than 90 nm, or less than 80 nm, or less than 70 nm, or less than 60 nm, or less than 50 nm, or less than 40 nm, or less than 30 nm, or less than 20 nm, or less than 10 nm. In some specific implementations, the anodic and/or cathodic catalyst particles can have an average maximum dimension of 2-5 nm. In some implementations, the anodic and/or cathodic catalyst particles will include porous particles.

In some implementations, cathodic catalyst will have [MTBD][$C_4F_9SO_3$] present at a weight ratio relative to the cathodic catalyst particles within a range of 1.25:1 to 3.85:1. In some implementations, cathodic catalyst will have [MTBD] [$C_4F_9SO_3$] present at a weight ratio relative to the cathodic catalyst particles within a range of 2:1 to 3:1. In some implementations, cathodic catalyst will have [MTBD] [$C_4F_9SO_3$] present at a weight ratio relative to cathodic catalyst particles within a range of 2.5:1 to 2.6:1.

Figure 3A:
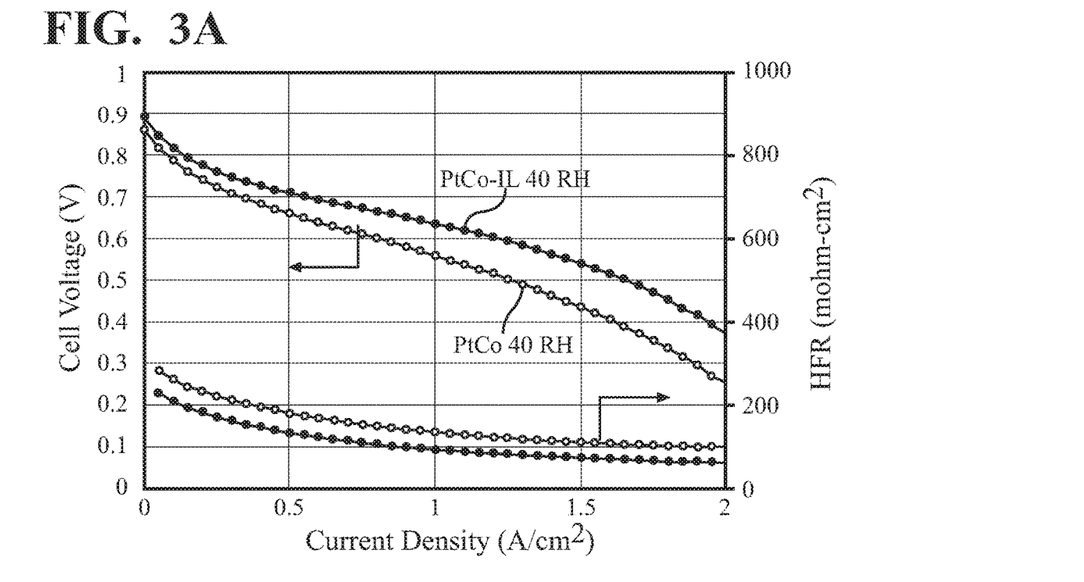
FIGS. 3A and 3B are plots of cell electric potential and power, respectively, as a function of current density for two PEMFCs operating at 40% relative humidity, the PEMFC using commercially obtained cathodic catalyst particles having a porous carbon support.
Figure 3B:
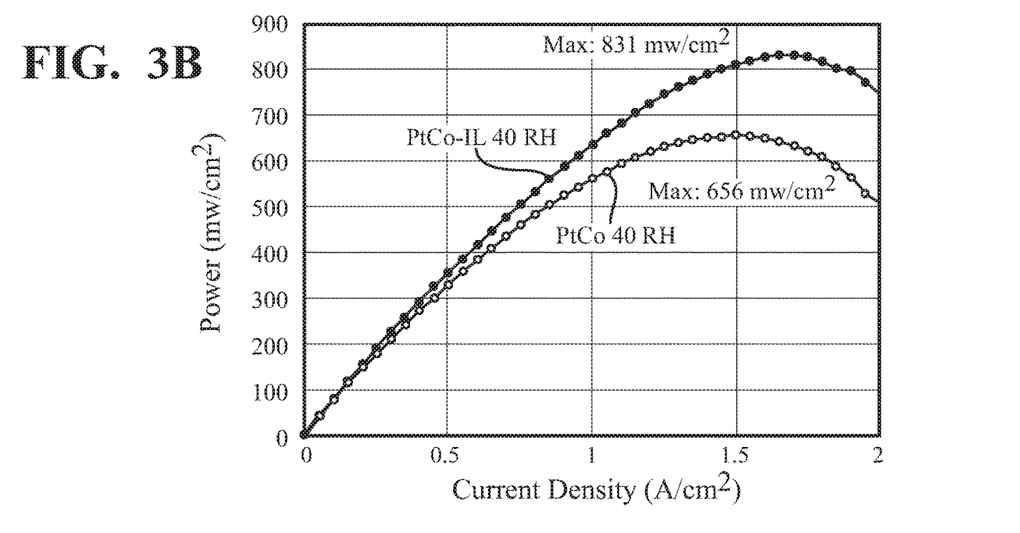
Figure 4A:
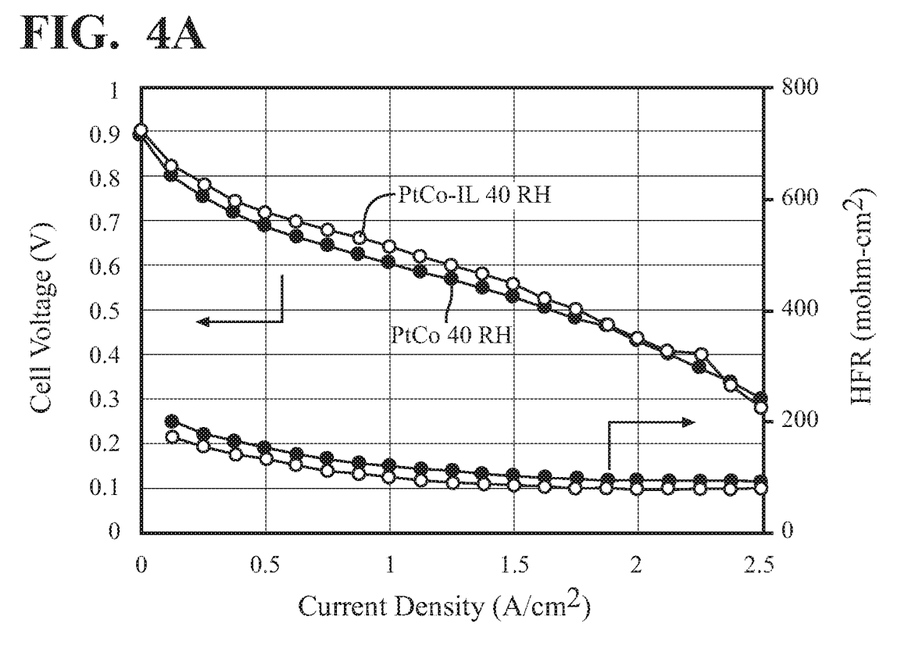
FIGS. 4A and 4B are plots of cell electric potential and power, respectively, as a function of current density for two PEMFCs operating at 40% relative humidity, the PEMFC using prepared cathodic catalyst particles having a non-porous carbon support.
Figure 4B:
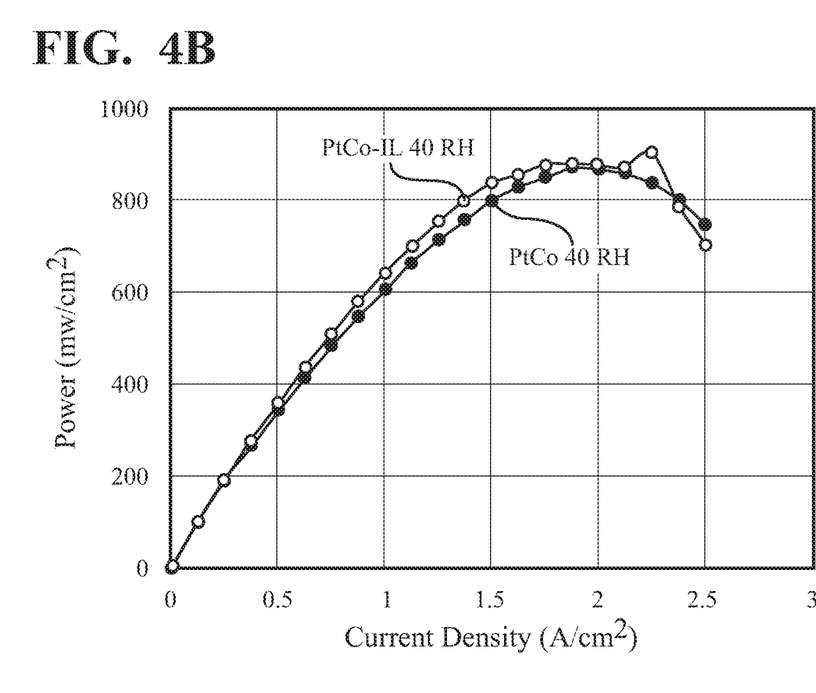

FIGS. 3A and 3B show plots of cell electric potential and power, respectively, as a function of current density for two PEMFCs operating at 40% relative humidity. Solid circles show the results for a cell having an MEA 100 of the present teachings, with commercially obtained PtCo alloy cathodic catalyst particles having a porous carbon support, while open circles show the results for a PEMFC having a comparative MEA that lacks [MTBD][$C_4F_9SO_3$] in the cathodic catalyst layer 130, but is otherwise identical to the MEA 100 of the present teachings. FIGS. 4A and 4B show plots similar to those of FIGS. 3A and 3B, with the exception that the PtCo alloy of the cathodic catalyst particles is prepared with non-porous carbon support—and with the difference that open circles correspond to the data for the cell having an MEA 100 of the present teachings while solid circles represent data for the comparative example.

The results show that the MEAs 100 of the present teachings, having the ionic liquid in the cathodic catalyst layer, outperform the comparative examples throughout the current range. In particular, the electrochemical impedance spectroscopy analysis shows that the proton diffusion resistance of the cathodic catalyst layer 130 having the disclosed ionic liquid is smaller than that of the cathodic catalyst layer lacking the ionic liquid. It will be noted that the activation loss in the MEAs 100 of the present teachings, having the ionic liquid in the cathodic catalyst layer, is smaller than the activation loss in the comparative examples that lack this ionic liquid. This may be due to enhances proton supply resulting from improved proton transport within the cathodic catalyst layer. It will further be noted that, particularly in the results of FIG. 3B, presence of the ionic liquid in the cathodic catalyst layer substantially improved the maximum power density.

It will be noted that the inclusion of [MTBD][$C_4F_9SO_3$] in the cathodic catalyst layer 130 of the MEA 100 appears to provide a greater performance enhancement when utilized in conjunction with a porous carbon support of the cathodic catalyst particles (FIGS. 3A and 3B) than when utilized in conjunction with a non-porous carbon support of the cathodic catalyst particles (FIGS. 4A and 4B). Without being bound by any particular theory, it is believed that this may be because the ionic liquid has superior adhesion to catalyst particles having a porous carbon support, and that this may further create functional differences in the surface morphology of the particle/ionic liquid composite.

Figure 5A:
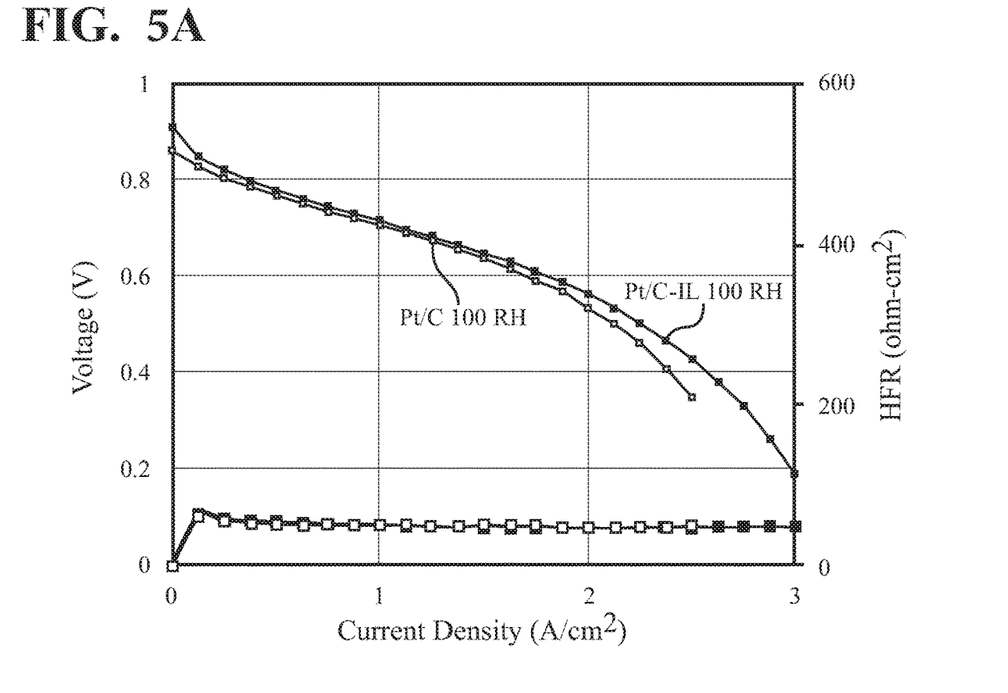
FIGS. 5A and 5B are plots of cell electric potential and power, respectively, as a function of current density for two PEMFCs operating at 100% relative humidity, the PEMFC using commercially obtained cathodic catalyst particles.
Figure 5B:
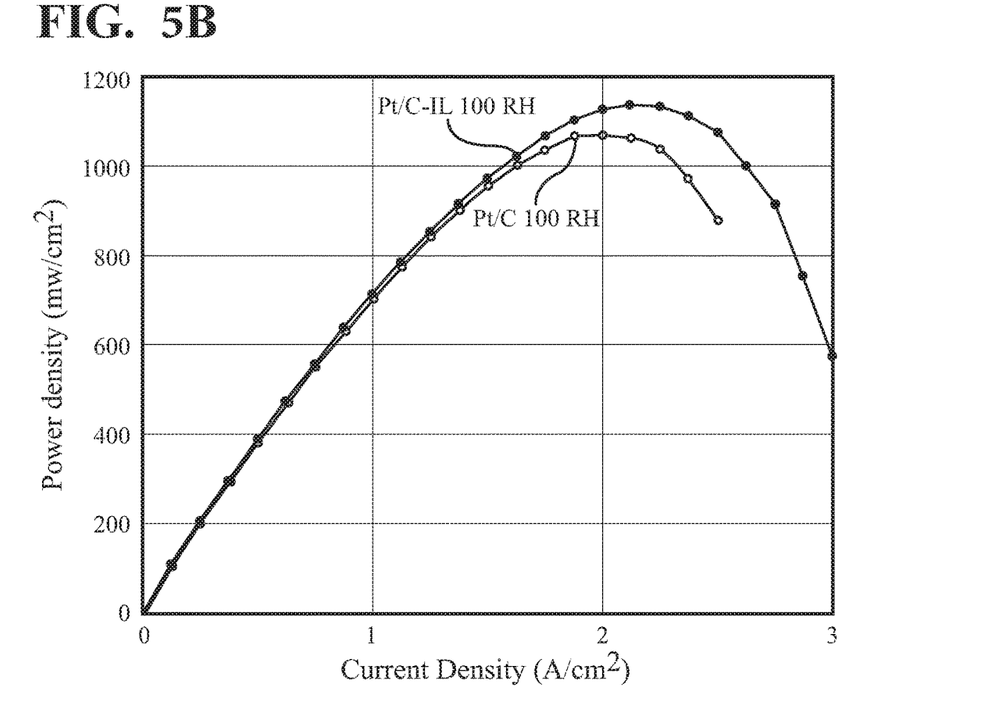

FIGS. 5A and 5B show plots of cell electric potential and power, respectively, as a function of current density for two PEMFCs operating at 100% relative humidity, using carbon-supported platinum (Pt/C) cathodic catalyst particles with or without the ionic liquid. In the case of FIGS. 5A and 5B, solid squares represent the data for the MEA 100 of the present teachings while open squares represent data for the comparative example lacking ionic liquid in the cathodic catalyst layer 130. The results show that the electric potential vs. current performance and power density of the MEA 100 of the present teachings, having ionic liquid in the cathodic catalyst layer 130, again outperform the comparative example throughout the current range. This is especially true in the high current density region (e.g. >2 A/cm$^2$). Without being bound by any particular theory, it is believed that at high relative humidity in the high current density region, air transportation within the cathodic catalyst layer 130 is the dominant factor and determines the cell performance. The superior performance of the MEA 100 of the present teachings can thus be attributed to the prompt removal of water and reduction of gas diffusion resistance. As a result, the cell performance is improved. It will be understood that a PEMFC can include a stack of multiple MEAs 100 of the present teachings. In some variations, an MEA 100 of the present teachings can include an anodic catalyst layer in which [MTBD][$C_4F_9SO_3$] is in admixture with carbon supported anodic catalyst particles.

The present invention is further illustrated with respect to the following examples. It needs to be understood that these examples are provided to illustrate specific embodiments of the present invention and should not be construed as limiting the scope of the present invention.

Example 1. Synthesis of 1-methyl-2,3,4,6,7,8-hexahydro-1H-pyrimido[1,2-a]pyrimidin-9-ium 1,1,2,2,3,3,4,4,4-nonafluorobutane-1-sulfonate ([MTBD][$C_4F_9SO_3$])

A solution of MTBD (3.00 g, 0.0196 mol) in water (100 mL) is cooled down to 0° C., and Nitric Acid (1.76 g, 0.0196 mol) is added drop wise to the solution. This is followed by the addition of potassium nonafluorobutane sulfonate (8.58 g, 0.0196 mol), with stirring for 1 hour. The resulting ionic liquid is separated as a viscous fluid phase beneath the water phase. It is washed 4 times with ultrapure water. The resulting ionic liquid is dried under reduced pressure at 50° C. for 18 hours to obtain a white material having a melting temperature of about 45° C.

Example 2. MEA Fabrication

The Pt(Co)/C-[MTBD][$C_4F_9SO_3$] and pristine Pt(Co)/C are used to be cathode material and evaluated in the MEA. The catalyst ink consists of ethanol, propylene glycol, water, Nafion ionomer (D2020), and catalysts. Pt(Co)/C samples used as cathodic catalyst particles are either commercially obtained (Tanaka Kikinzoku Kogyo) PtCo alloy on Ketjen black (FIGS. 3A and 3B) or prepared PtCo alloy, of similar composition and loading density, on oxidized small acetylene black (FIGS. 4A and 4B). The ionomer to carbon (I/C) weight ratio and the solid content are kept at 0.9 and 14 wt. %, respectively. The ink slurry is vigorously mixed and coated on a poly (tetrafluoro-ethylene) substrate (0.002" thick, Macmaster-CARR) using a doctor-blade casting method. Similarly, a Pt/C (30 wt. % Pt content, TEC10EA30E, TKK) catalyst layer with I/C ratio at 1.07 is prepared as the anode material. The coating layer is dried at 80° C. to remove the solvent. The final anode and cathode Pt loading are controlled at 0.05 and 0.1~0.15 mgPt/cm2

Individual cathode and anode electrocatalyst layer (2 cm×2 cm) is punched and sandwiched between a Nafion 211 membrane to form a catalyst coated membrane (CCM) using a decal-transfer technique. The hot-pressing condition is 130° C., 0.8 Mpa, and 5 mins. The gas diffusion layers (29 BC, SGL Carbon) together with CCM are assembled in a single cell with a serpentine flow field (Scribner Associates).

Example 3. MEA Evaluation

A 850e Fuel Cell test system (Scribner Associates) is used for the MEA performance evaluation. The MEA is first activated by sweeping between 0.9 V to 0.1 V for several hundred times cycles under H2/Air (0.5 NLPM/1 NMPM) at 45° C. and 100% relative humidity (RH). Then the i-V performance of the MEAs are tested at 80° C. under 40% RH and 100% RH, respectively. Ultrapure H2 and Air (Airgas) are supplied to the anode and cathode with an absolute pressure of 150 Kpa. The current density is set with an incremental of 0.05 A/cm2 until 2 A/cm2 and the response voltage is recorded simultaneously. The High frequency resistance (HFR) is also examined throughout the measurement.

A gravimetric method is used to determine $O_2$ solubility in ILs. The weight change of the sample is monitored at a fix temperature and pressure as $O_2$ absorbed or desorbed. Specifically, a magnetic suspension balance (MSB) (Rubotherm GmbH) is used. Initially, about 1 g of ionic liquid sample is added to the sample bucket and then degassed to c.a. $10^{-5}$ bar. After evaporating the water and other volatile impurity, the chamber is pressurized with $O_2$ to a certain pressure. The vapor-liquid equilibrium between $O_2$ and the ionic liquid sample is reached and confirmed by constantly weighing for at least 20 mins. After obtaining the absorption isotherm, the pressure in the sample chamber is decreased stepwise to obtain the desorption isotherm. The absorption and desorption isotherms constituted a full isotherm. The values are corrected by buoyancy effect. The $O_2$ diffusion coefficient is obtained from a time-dependent absorption profile, and the $O_2$ absorption is mathematically modeled by a simplified mass diffusion process.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A membrane electrode assembly (MEA) for a polymer electrolyte membrane fuel cell, the MEA comprising:
    an anodic catalyst layer comprising:
        carbon supported anodic catalyst particles, the anodic catalyst particles comprising particles of a metal selected from the group consisting of:
            platinum; and
            a platinum alloy;
    a cathodic catalyst layer comprising a mixture of:
        carbon supported cathodic catalyst particles, the cathodic catalyst particles comprising particles of a metal selected from the group consisting of:
            platinum; and
            a platinum alloy; and
        an ionic liquid, comprising 1-methyl-2,3,4,6,7,8-hexahydro-1H-pyrimido[1,2- a]pyrimidin-9-ium 1,1,2,2,3,3,4,4,4-nonafluorobutane-1-sulfonate ([MTBD][$C_4F_9SO_3$]); and
    a polymer electrolyte membrane mediating protic communication between the anodic catalyst layer and the cathodic catalyst layer.

2. The MEA as recited in claim 1, wherein the cathodic catalyst particles comprise a platinum alloy.

3. The MEA as recited in claim 1, wherein the cathodic catalyst particles comprise a platinum-cobalt alloy.

4. The MEA as recited in claim 3, wherein a weight ratio of platinum to cobalt in the platinum-cobalt alloy of the cathodic catalyst layer is about 10:1.

5. The MEA as recited in claim 1, wherein a weight ratio of ionic liquid to carbon-supported cathodic catalyst particles is about 1:10.

6. The MEA as recited in claim 1, wherein the polymer electrolyte membrane comprises perfluorosulfonic acid.

7. The MEA as recited in claim 1, wherein the cathodic catalyst layer comprises a solid ionomer.

8. A membrane electrode assembly (MEA) for a polymer electrolyte membrane fuel cell, the MEA comprising:
    an anodic catalyst layer comprising a mixture of:
        carbon supported anodic catalyst particles, the anodic catalyst particles comprising particles of a metal selected from the group consisting of:
            platinum; and
            a platinum alloy; and
        an ionic liquid, comprising 1-methyl-2,3,4,6,7,8-hexahydro-1H-pyrimido[1,2- a]pyrimidin-9-ium 1,1,2,2,3,3,4,4,4-nonafluorobutane-1-sulfonate ([MTBD][$C_4F_9SO_3$]);
    a cathodic catalyst layer comprising a mixture of:
        carbon supported cathodic catalyst particles, the cathodic catalyst particles comprising particles of a metal selected from the group consisting of:
            platinum; and
            a platinum alloy; and
        an ionic liquid, comprising ([MTBD][$C_4F_9SO_3$]); and
    a polymer electrolyte membrane mediating protic communication between the anodic catalyst layer and the cathodic catalyst layer.

9. The MEA as recited in claim 8, wherein the cathodic catalyst particles comprise a platinum alloy.

10. The MEA as recited in claim 8, wherein the cathodic catalyst particles comprise a platinum-cobalt alloy.

11. The MEA as recited in claim 10, wherein a weight ratio of platinum to cobalt in the platinum-cobalt alloy in the cathodic catalyst layer is about 10:1.

12. The MEA as recited in claim 8, wherein a weight ratio of ionic liquid to carbon-supported cathodic catalyst particles in the cathodic catalyst layer is about 1:10.

13. The MEA as recited in claim 8, wherein the polymer electrolyte membrane comprises perfluorosulfonic acid.

14. The MEA as recited in claim 8, wherein the cathodic catalyst layer comprises a solid ionomer.

15. A polymer electrolyte membrane fuel cell (PEMFC) comprising a plurality of stacked membrane electrode assemblies (MEAs), each MEA of the plurality comprising:
   an anodic catalyst layer comprising:
      carbon supported anodic catalyst particles, the anodic catalyst particles comprising particles of a metal selected from the group consisting of:
         platinum; and
         a platinum alloy;
   a cathodic catalyst layer comprising a mixture of:
      carbon supported cathodic catalyst particles, the cathodic catalyst particles comprising particles of a metal selected from the group consisting of:
         platinum; and
         a platinum alloy; and
      an ionic liquid, comprising 1-methyl-2,3,4,6,7,8-hexahydro-1H-pyrimido[1,2- a]pyrimidin-9-ium 1,1,2,2,3,3,4,4,4-nonafluorobutane-1-sulfonate ([MTBD][$C_4F_9SO_3$]); and
   a polymer electrolyte membrane mediating protic communication between the anodic catalyst layer and the cathodic catalyst layer.

16. The PEMFC as recited in claim 15, wherein the cathodic catalyst particles comprise a platinum alloy.

17. The PEMFC as recited in claim 15, wherein the cathodic catalyst particles comprise a platinum-cobalt alloy.

18. The PEMFC as recited in claim 17, wherein a weight ratio of platinum to cobalt in the platinum-cobalt alloy of the cathodic catalyst layer is about 10:1.

19. The PEMFC as recited in claim 15, wherein a weight ratio of ionic liquid to carbon-supported cathodic catalyst particles is about 1:10.

20. The PEMFC as recited in claim 15, wherein the polymer electrolyte membrane comprises perfluorosulfonic acid.

* * * * *

UNITED STATES PATENT AND TRADEMARK OFFICE
CERTIFICATE OF CORRECTION

PATENT NO. : 11,189,851 B2
APPLICATION NO. : 16/239082
DATED : November 30, 2021
INVENTOR(S) : Kan Huang, Hongfei Jia and Hisao Kato Page 1 of 1

It is certified that error appears in the above-identified patent and that said Letters Patent is hereby corrected as shown below:

In the Claims

Column 8, Claim 1, Line 8: delete "pyrirmido" and insert --pyrimido--

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*